United States Patent

[11] 3,555,997

| [72] | Inventor | Cornelis Van der Lely<br>Bruschenrain 7, Zug, Switzerland |
|---|---|---|
| [21] | Appl. No. | 621,541 |
| [22] | Filed | Mar. 8, 1967 |
| [45] | Patented | Jan. 19, 1971 |
| [32] | Priority | Aug. 24, 1966, Mar. 11, 1966, Sept. 2, 1966, Apr. 29, 1966, Dec. 6, 1966 |
| [33] | | Netherlands |
| [31] | | Nos. 6,611,881, 6,603,156, 6,612,380, 6,605,770 and 6,617,098 |

[54] CROP STORE
23 Claims, 26 Drawing Figs.

[52] U.S. Cl. .................................................. 100/66, 100/189, 100/215, 100/218, 100/229; 214/83.3, 214/83.32
[51] Int. Cl. ............................................. B65g 3/10, B30b 15/30, B30b 15/32
[50] Field of Search............................................ 100/65—69, 229.A, 189, 190.66, 218, 215; 214/83.3, 83.32, 41, 82, 507, 17.6

[56] References Cited
UNITED STATES PATENTS

| 2,807,377 | 9/1957 | Pellat-Finet.................. | 214/17 |
|---|---|---|---|
| 1,043,041 | 10/1912 | Bryan............................ | 100/189UX |
| 2,365,240 | 12/1944 | Arnold.......................... | 214/17X |
| 2,488,657 | 11/1949 | Biszantz et al................ | 214/83.32UX |
| 2,591,970 | 4/1952 | Seegers et al................. | 100/190X |
| 2,622,748 | 12/1952 | Feidert......................... | 214/83.3 |
| 3,013,675 | 12/1961 | Schonrock................... | 214/41 |
| 3,059,789 | 11/1962 | Bowles......................... | 214/41 |
| 3,229,320 | 1/1966 | Cymara......................... | 100/229UX |
| 3,231,107 | 1/1966 | Clar............................... | 100/229UX |
| 3,250,414 | 5/1966 | Pioch............................ | 100/229UX |
| 3,338,435 | 8/1967 | Rey................................ | 214/17 |

Primary Examiner—Peter Feldman
Attorney—Mason, Mason & Albright

ABSTRACT: The invention relates to a crop store and to a mechanism for loading same. The crop store may have a movable wall and pressure indicating means. Also more than one compartment can be included in the crop store. The loading mechanism is compressing means, preferably a rotatable screw conveyor or a reciprocating piston, which communicates with the crop store via a supply channel.

PATENTED JAN 19 1971

INVENTOR
CORNELIS VAN DER LELY
BY
Mason, Mason & Albright
Attorneys

PATENTED JAN 19 1971

INVENTOR
Cornelis van der Lely
BY
Mason, Mason & Albright
Attorneys

INVENTOR
CORNELIS VAN DER LELY

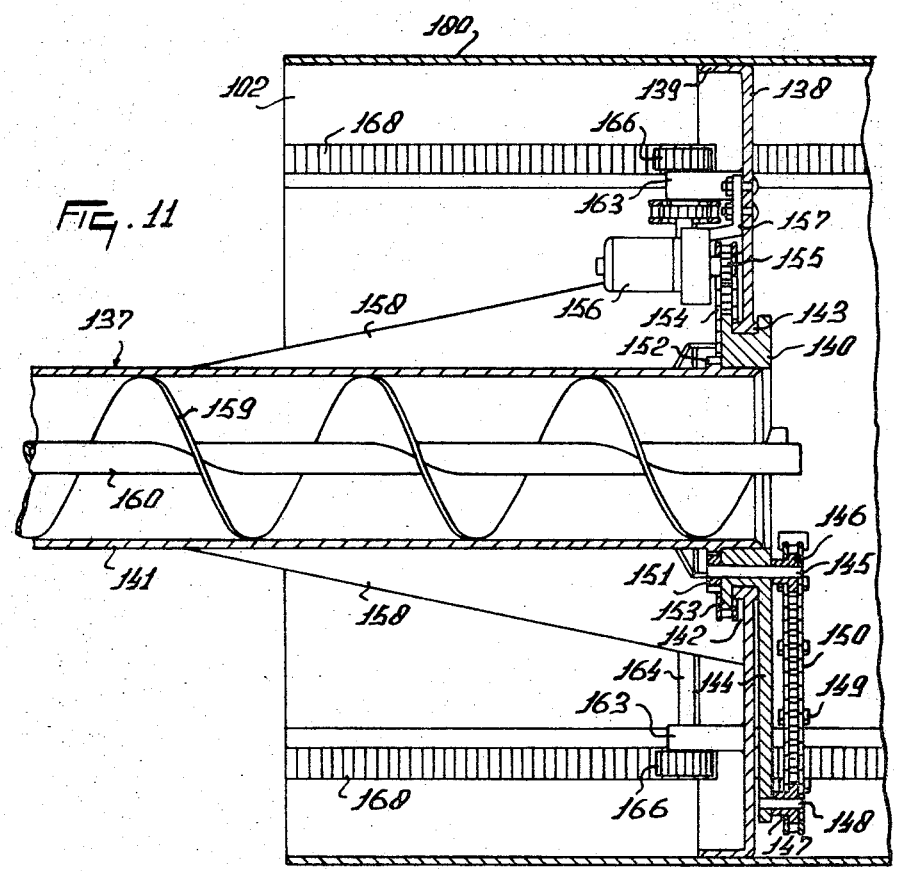

PATENTED JAN 19 1971

INVENTOR
CORNELIS VAN DER LELY
BY
Mason, Mason & Albright
Attorneys

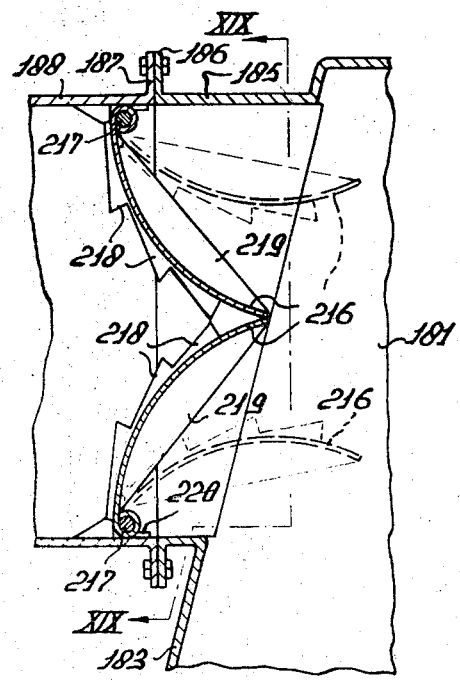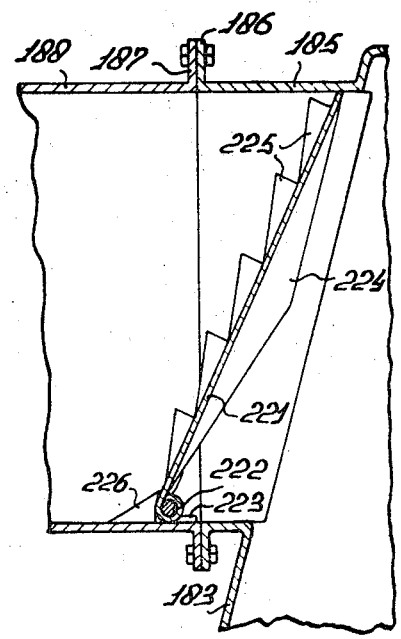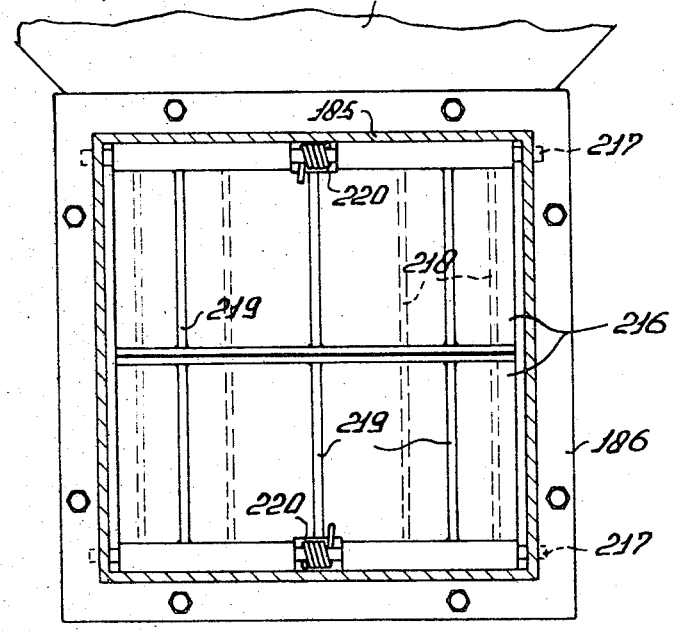

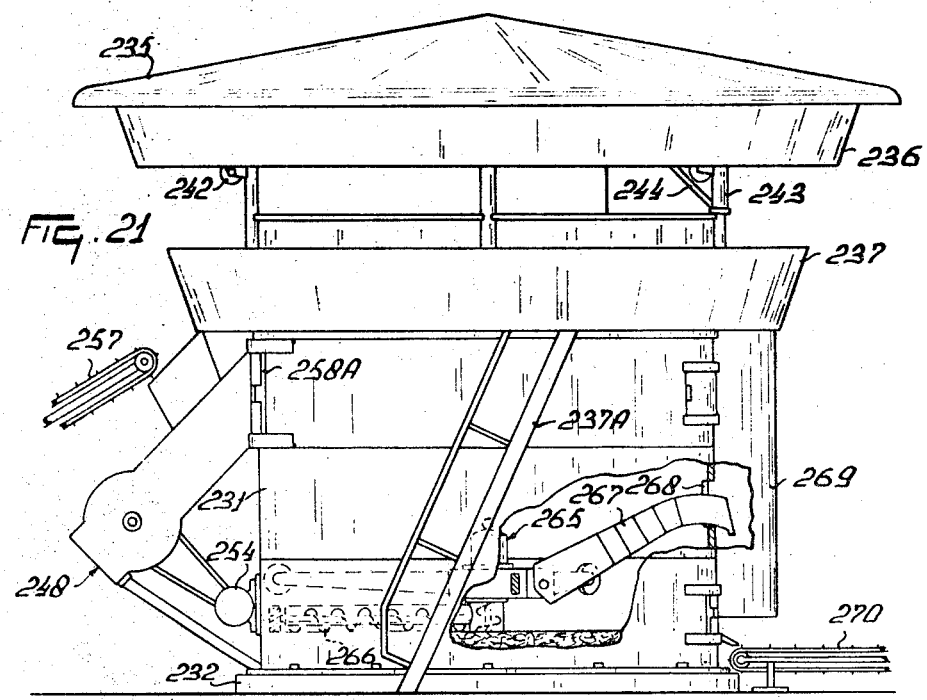
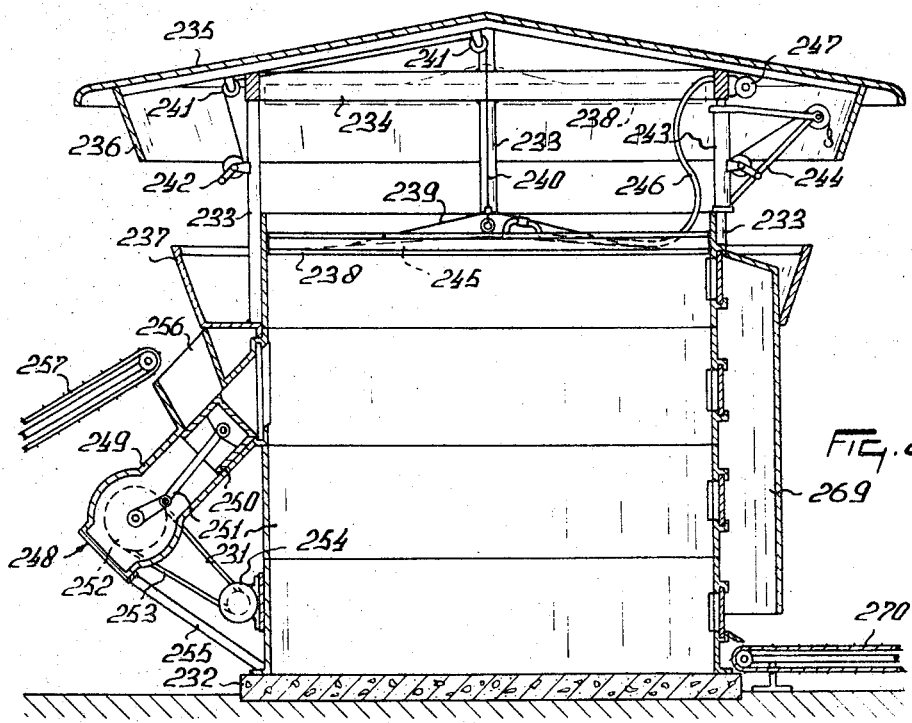

INVENTOR
CORNELIS VAN DER LELY

CROP STORE

According to the invention there is provided a crop store wherein means are provided for feeding crop in harvested form, under high pressure into the store.

For a better understanding of the invention and to show how the same may be carried into effect, reference will be made by way of example to the accompanying drawing.

FIG. 11 is a view taken on the line XI–XI in FIG. 10.

FIG. 18 shows on an enlarged scale a retaining member arranged near one end of the supply channel of the compressing member.

FIG. 19 is a view in section taken on the line XIX–XIX in FIG. 18.

FIG. 20 shows a second embodiment of a retaining member.

FIG. 21 is a side view of a sixth embodiment of a crop store according to the invention, part of the wall being omitted and a discharge member for stored crop being shown.

FIG. 22 is a view in section of the crop store shown in FIG. 21, the discharge member and the stored crop being omitted for the sake of clarity.

Figure 1:
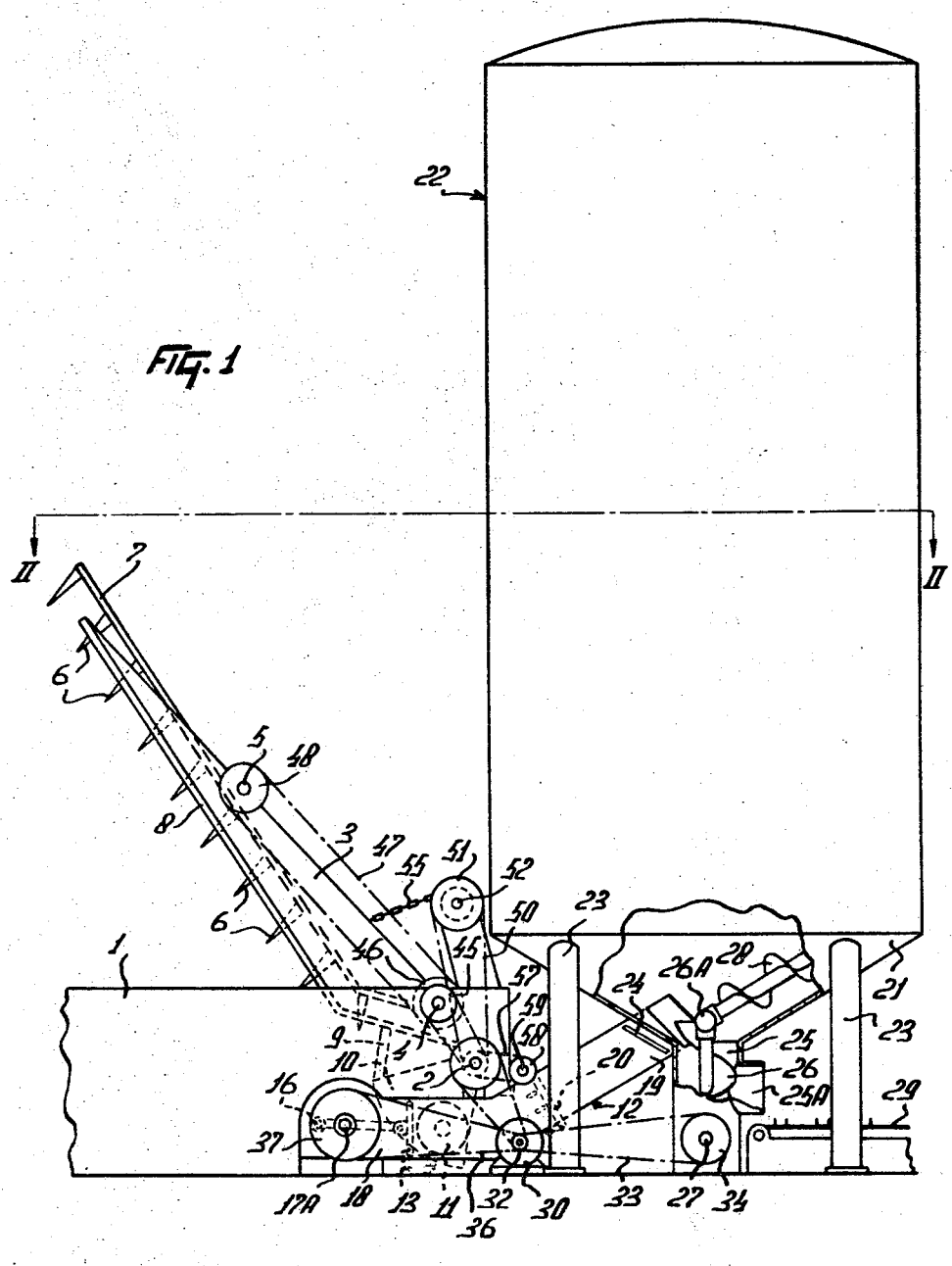
FIG. 1 is a side view partly in section of a first form of crop store provided with a first form of compressing device feeding crop in the harvested form into the store.
Figure 2:
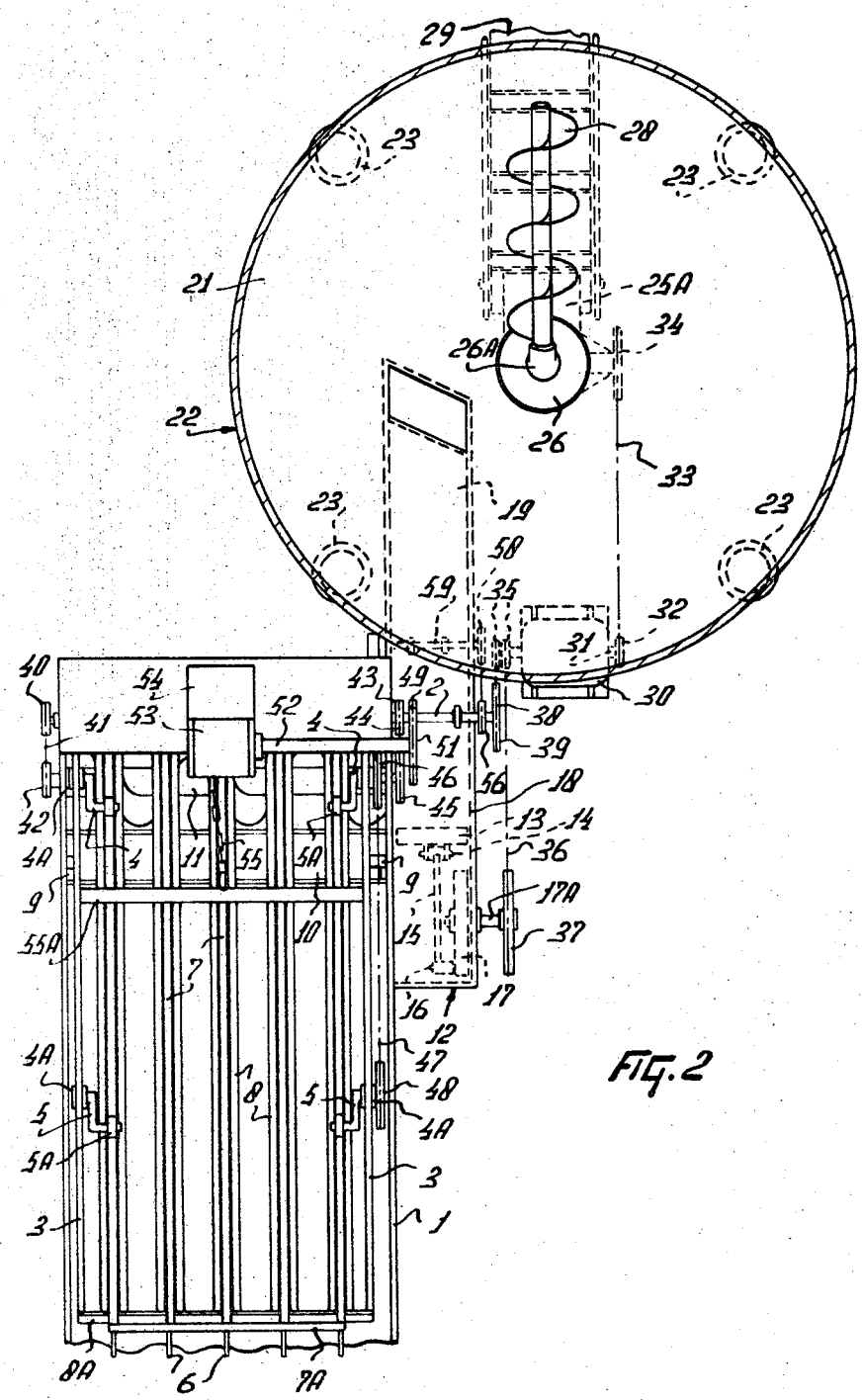
FIG. 2 is a plan view partly in section and taken on the line II–II of FIG. 1.

The first form of crop store of FIGS. 1 and 2 comprises a dosing or supply device having a floor with substantially vertical upright walls 1 on its longer sides. The upright walls 1 extend beyond the rear end of the floor and are interconnected by a vertical upright wall.

A shaft 2 is journaled in bearings, secured to the walls 1. Near each end, inside the walls 1 the shaft 2 is provided with a pivotable support 3, formed by a plate, by means of a bearing. Crank shafts 4 and 5 are arranged between the supports 3 by means of bearings 4A at distances from the shaft 2 equal to about one-third and two-thirds respectively of the length of a support. By means of bearings 5A said crank shafts 4 and 5 are pivoted to supports 7, provided with tines 6. In the embodiment shown in FIG. 2 five tined supports are arranged side by side at regular intervals. The crank shafts are connected with the outermost supports and the ends of the inner supports 7 are connected by means of a beam 7A with the ends of the outermost supports.

Underneath the tined supports 7 a screening is provided which comprises a plurality of bars or strips 8, arranged so that elongated slots are formed for the tines 6 on the supports 7, through which the tines are adapted to move. The outermost bars or strips 8 are arranged below the plate-shaped supports 3. The intermediate bars or strips 8 are connected at their ends with transverse beams 8A, arranged between the plate-shaped supports 3. The strips 8 serve as scrapers. As will be seen from FIG. 1 the plate-shaped supports 3 and the strips 8 are shaped in a form such that, viewed from aside, the lower side of a plate-shaped support and the strips are similar to the supports 7. By means of arms 9 the supports 3 have secured to them a wall 10, which is concentrical to the shaft 2 and which joins a rising portion of the floor of the supply device. Beneath the shaft 2 and above the wall 10 a conveying member formed by a worm conveyor 11 extends transversely of the longitudinal direction of the tined supports 7. The lower side of the worm conveyor is surround through an angle of 180° by a screen portion (not shown), which joins the wall 10 by one side.

On one side of the arrangement described above a supply channel 12 extends parallel to the upright walls 1 (see FIG. 2). This supply channel 12 comprises a compressing ram 13, which is pivoted at the rear by means of a shaft 14 to a pitman 15. The pitman 15 is arranged by its end remote from the compressing ram 13 on a stub shaft 16. The stub shaft 16 is secured to a flywheel 17, which is arranged on a shaft 17A, which projects from the supply channel 12. The worm conveyor 11, associated with the dosing or supply device, opens out in an opening provided in a vertical wall of the supply channel. It will be seen from FIG. 1 that the supply channel comprises a portion 18, which extends along the upright wall 1 of the supply device in a substantially horizontal direction, which portion changes into an obliquely ascending portion 19. Near the transitional area between the portions 18 and 19 the latter comprises pairs of cutters 20. The cutters of one pair, which are spread apart from each other, extend substantially vertically, whereas the cutters of the other pair cross the cutters of the first-mentioned pair at right angles. The cutters 20 are taken through slots in the walls of the supply channel.

On one side the cutters are pivoted to the outer side of the wall of the supply channel, whereas at the other end they are connected with a crank mechanism (not shown), which imparts a reciprocatory movement to the cutters during operation. The obliquely ascending portion 19 opens out in a tapering base 21 of a cylindrical store or silo 22, near the centerline. The silo 22 is supported from four columns 23, which are secured to the silo near the transition between the base 21 and the cylindrical portion. The opening of the supply channel 12 in the silo 22 can be closed by means of a flap 24. The base 21 of the silo 22 changes into a vertical duct 25, which extends down to the ground. The duct 25 accommodates a worm conveyor 26, one end of which is journaled in a bearing (not shown) on the lower side of the duct. Near the lower side the rotary shaft of the worm conveyor 26 has a bevel gear wheel (not shown), which is adapted to cooperate with a bevel gear wheel (not shown either) on a substantially horizontal shaft 27, which projects from the duct 25. The upper end of the worm conveyor 26 is connected by a universal joint 26A with a worm conveyor 28, extending substantially parallel to the walls of the base 21 of the silo 22. The duct 25 is provided near its center with an outlet 25A, which opens out above a conveyor 29, arranged below the silo 22 and comprising an endless conveyor belt.

The drive of the supply device, of the compressing ram 13 in the supply channel and of the worm conveyors 26 and 28 in the silo 22 is obtained from an electric motor 30. For this purpose one side of the shaft 31 of the electric motor 30 has a pulley 32, which is linked by a belt 33 to a pulley 34 on the shaft 27, which projects from the duct 25. On the other side of the electric motor 30 the rotary shaft 31 has pulleys 35, one of which is linked by means of a belt 36 to a pulley 37 on the shaft 17A. The other pulley 35 is linked by a belt 38 to a pulley 39 on the shaft 2. The shaft 2 has a pulley 40, which is linked by a belt 41 to a pulley 42 on the rotary shaft of the worm conveyor 11. A pulley 43 on the shaft 2 is linked by a belt 44 to a pulley 45 on the crank shaft 4. A pulley 46 on the crank shaft 4 is linked by a belt 47 to a pulley 48 on the crank shaft 5. A pulley 49 on the shaft 2 is linked by a belt 50 to a pulley 51 on a rotary shaft 52 of a winch 53, which is arranged by means of a support 54 on the upper side of the vertical walls 1. A chain 55 is guided around the winch 53 and connected with a beam 55A, arranged centrally between the supports 3. The drive of the cutters 20 is obtained by means of a pulley 56 on the shaft 2, which is linked by a belt 57 to a pulley 58 on a driving shaft 59.

The arrangement described above operates as follows:

The floor of the dosing or supply device is adapted to receive between the upright walls 1 a quantity of crop, for example, from a loading truck. By means of the winch 53 with the chain 54 to which the supports 3, to which the supports 7 with their tines 6 are secured, can be turned about the shaft 2 into the topmost position. After the crop is shed on the floor, the supports 3 are turned to an extent such that the tines 6 of the supports 7 are capable of displacing the crop. By means of the electric motor 30 the drive of the supports 7 can then be switched on. The supports 7 perform a reciprocatory movement, while they gradually move downwards, so that the tines 6 throw the crop over and across the wall 10, which crop thus arrives within reach of the worm conveyor 11. The worm conveyor 11 can then convey the crop through the opening provided in the wall of the supply channel 12. Consequently, the supply device for the supply channel operates automatically. The compressing ram 13 accommodated in the supply channel 12 performs a reciprocatory movement so that the crop conveyed by the worm conveyor is feeded to the front. This forwardly moving crop is cut into lumps by the moving cutters 20 and conveyed further through the obliquely ascending portion 19 of the supply channel, after which it is feeded into the base 21 of the silo 22. In this manner the silo is filled automatically, while the crop to be feeded into the silo is pushed from below into the silo against the weight of the crop inserted before. When the silo is approximately filled, the mass is compressed by the high pressure produced by the crop emerging from the supply channel. The high pressure has to denote herein the pressure under which the crop is compressed to an extent such that the air is expelled almost completely and thus a satisfactory preservation is obtained. After the silo is filled, the inlet opening may be closed by the flap 24. If desired, the silo can be discharged by means of the relatively cooperating worm conveyors 26 and 28. The crop is conveyed by the rotating worm conveyors 26 and 28 through the outlet 25A of the duct 25 to the conveyor belt arranged beneath the silo, from where the crop can be transported to feeding devices, for example.

Figure 3:
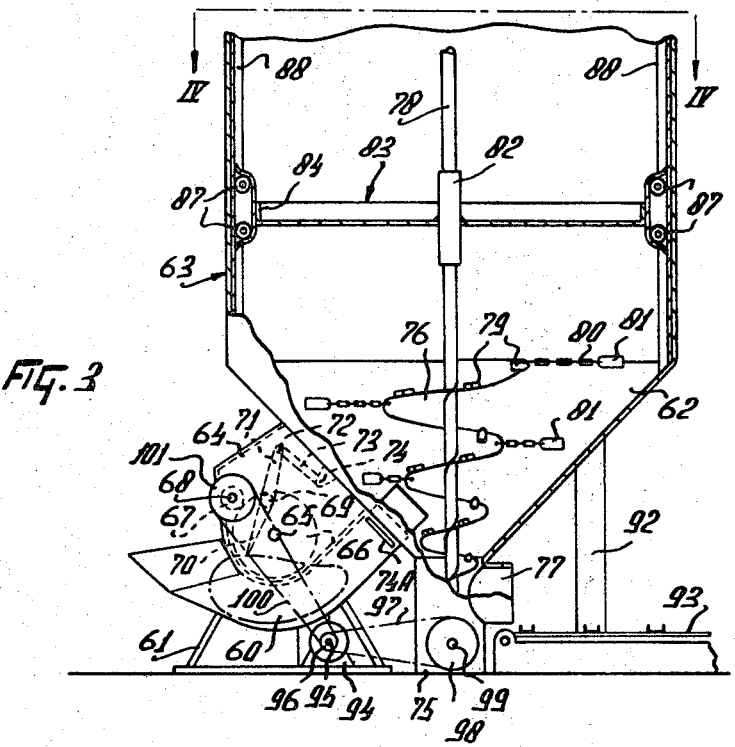
FIG. 3 is a side view partly in section of a second form of crop store provided with a second form of compressing device for feeding crop in the harvested form into the store.
Figure 4:
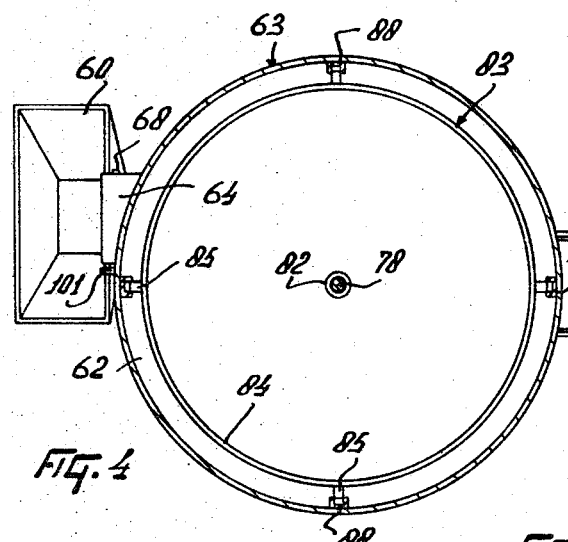
FIG. 4 is a sectional plan view taken on the line IV–IV in FIG. 3.
Figure 5:
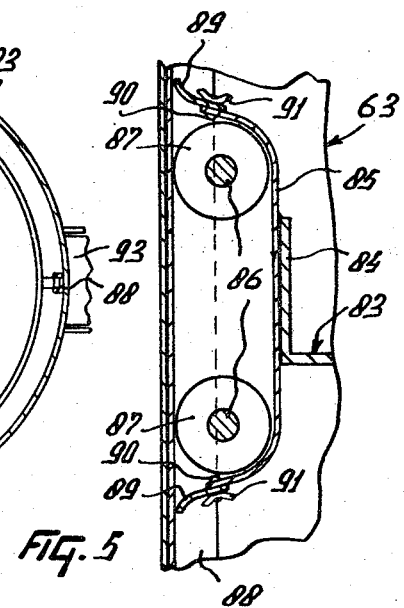
FIG. 5 is a sectional side view on an enlarged scale of a guide for a crop cover provided in the store of FIGS. 3 and 4.

In the embodiment shown in FIGS. 3 to 5 the dosing or supply device comprises a supply channel 60, which is arranged on a frame 61 and terminates in a funnel. The other end of the supply channel 60 opens out in the tapering base 62 of a cylindrical crop store or silo 63. Above the supply channel 60 two spaced, substantially vertical walls 64 are arranged. These walls are provided with stub shafts 65, having gear wheels 66, located inside the walls. The gear wheels 66 are adapted to cooperate with gear wheels 67 on a shaft 68 between the walls 64. Eccentrically to the stub shaft 65 a pipe 69 is rotatably arranged between the gear wheels 66. The pipe 69 is provided with equally spaced tines or arms 70. Near its end the pipe 69 is provided with an arm 71. Each arm 71 is pivoted by a pin 72 to an arm 73, which is pivoted by a pin 74 to a wall of the silo. The tines 70 on the pipe 69 are adapted to move through slots in the upper side of the supply channel 60 during the rotation of the gear wheels 66. The ends of the tines or arms 70 trace, inside the supply channel, the kidney-shaped path shown in FIG. 3. The outlet opening of the supply channel 60 in the silo 63 can be closed by means of a flap 74A. The lower side of the base 62 of the silo 63 changes into a duct 75, which accommodates a worm conveyor 76. The duct 75 is provided near its center with an outlet opening 77. The worm conveyor 76 in the duct 75 is provided with a shaft 78, the upper end of which is journaled in the silo. The worm conveyor 76 extends in the cylindrical portion of the silo up to the transition of the tapering base 62. The diameter of the worm conveyor 76 increases from its part inside the duct 75 up to the upper end. Approximately from the upper side of the duct 75 the worm conveyor 76 is provided with equidistant cutters 79. At equal distances one above the other flexible members formed by chains 80 with lengths increasing in upward direction are provided on the worm conveyor, the ends of said chains being provided with knockers 81.

The shaft 78, which extends to the upper end of the silo, is surrounded by a slidable sleeve 82, which is secured near its center to a plate-shaped cover 83, extending in the cross-sectional area of the silo and joining approximately the walls of the silo by an upwardly bent over rim 84. The rim 84 is provided with vertical supports 85. As will be seen from FIG. 4, the supports 85 are spaced apart from each other by distances corresponding to angles of 90°. The supports 85 form the carriers of rollers 87, adapted to rotate about shafts 86, said rollers being located at a distance one above the other and adapted to cooperate with U-shaped guides 88 on the inner walls of the silo. FIG. 5 shows that the ends of the supports 85 are provided with scrapers 89, which are adjustably arranged on the supports by means of bolts 90 with wing nuts 91 in slots. The scrapers 89 extend as far as in the U-shaped guides 88 and can be adjusted through openings (not shown) in the silo wall, which can be closed. Beneath the silo, which is supported from columns 92, an endless conveyor belt 93 is arranged so that one end is located beneath the outlet opening 77 of the duct 75.

The supply device and the movable parts of the silo are driven by an electric motor 94. The rotary shaft 95 of the electric motor 94 has a pulley 96, which is linked by a belt 97 to a pulley 98 on a horizontal shaft 99, by means of which the worm conveyor 76 in the silo is driven via bevel gear wheels (not shown).

The rotary shaft 95 of the electric motor 94 has furthermore a second pulley, which is coupled by a belt 100 with a pulley 101 on the shaft 68, provided with the gear wheels 67.

The arrangement shown in FIGS. 3 to 5 operates as follows:

Crop carried from the field by a trailer can be shed into the funnel-shaped end of the supply channel 60. After the electric motor is switched on, the crop is pushed by the tines or arms 70, moving inside the supply channel 60, further into the channel, so that after having been cut by cutters which may be provided in the channel, the crop is conveyed from below into the tapering base 62 of the silo 63. According as the silo is filled, the cover or wall 83 is capable of shifting in a direction of height by means of the rollers 87 in the guides 88 on the wall of the silo and the sleeve 82, slidable along the shaft 78. When the silo is completely filled, the inlet opening of the supply channel to the silo can be closed by a flap 74. Also in this case the operation of the supply device against the weight of the crop can produce such a high pressure, when the silo is almost filled, that a substantially complete compression of the crop is obtained.

For discharging purposes the silo is provided with a delivery device comprising a movable member formed by a worm conveyor 76. This member is provided with catches formed by knockers 81, which can occupy different positions with respect to the member. By means of the cutters 79 the compressed crop is cut loose, after which the crop is further loosened by the knockers 81 and conveyed by the worm conveyor towards the duct 75, from where it arrives finally through the outlet opening 77 at the conveyor belt 93. The direction of rotation of the worm conveyor 76 may be inverted, so that this worm conveyor assists in filling the silo.

In order to vary the pressure in the silo the cover may be provided with ballast, which can be arranged in the space surrounded by the rim 84.

The constructions described above provide a device for automatically conveying crop into a crop store, whilst the device may be comparatively simple and compact.

In the first embodiment the silo may be filled with crop cakes formed by means of the compressing ram and the movable cutters in the supply channel.

Figure 6:
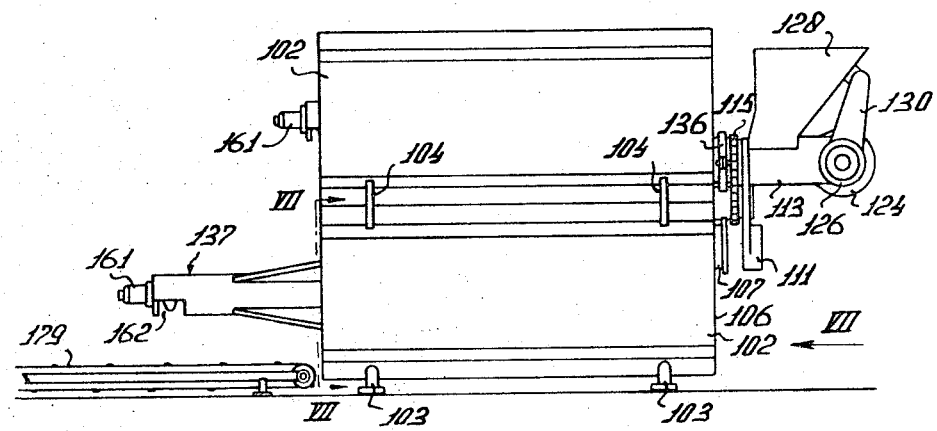
FIG. 6 is a diagrammatic side elevation of a third form of a crop store according to the invention.
Figure 7:
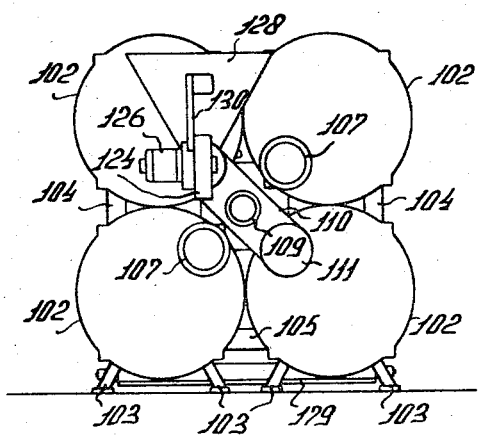
FIG. 7 is a view in the direction of the arrow VII in FIG. 6.
Figure 8:
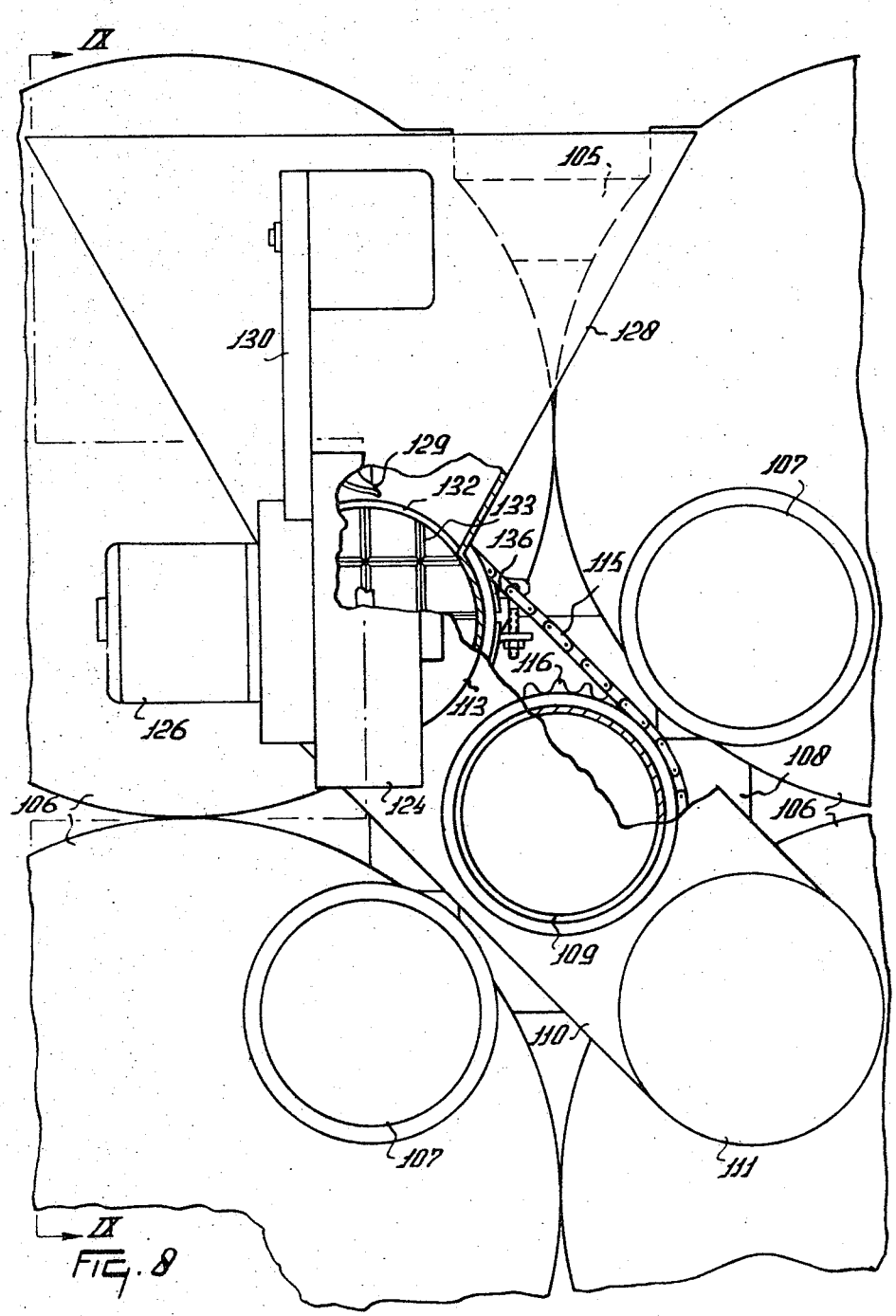
FIG. 8 is a view on an enlarged scale of the system shown in FIG. 7 and partly a view in section of the compressing member.

The construction shown in FIGS. 6 to 12 relates to a store having four cylindrical store spaces or silos 102. The silos 102 are arranged so that their axis of symmetry is substantially horizontal, as is shown in FIGS. 6 and 7, one pair of silos is arranged above a further pair. The silos of the lower pair are provided on the lower side near each of the ends with pairs of supports 103, by which the assembly bears on the ground. Between the pairs of silos vertical connecting pieces 104 and horizontal connecting pieces 105 are arranged. Each of the silos 102 preferably has a circular cross section and is provided at one end with a circular inlet opening 107 in a wall 106, extending transversely of the axis of symmetry.

The inlet openings 107 of the various silos are disposed so that their centers are located on a circle, the center of which is located on a line extending parallel to the longitudinal center lines of the silos at equal distances from them.

At one end of the silos 102 a substantially square plate 108 is arranged between the silos so as to extend at right angles to the longitudinal centerlines of the sukis silos and to form a support for a pipe 109.

Figure 9:
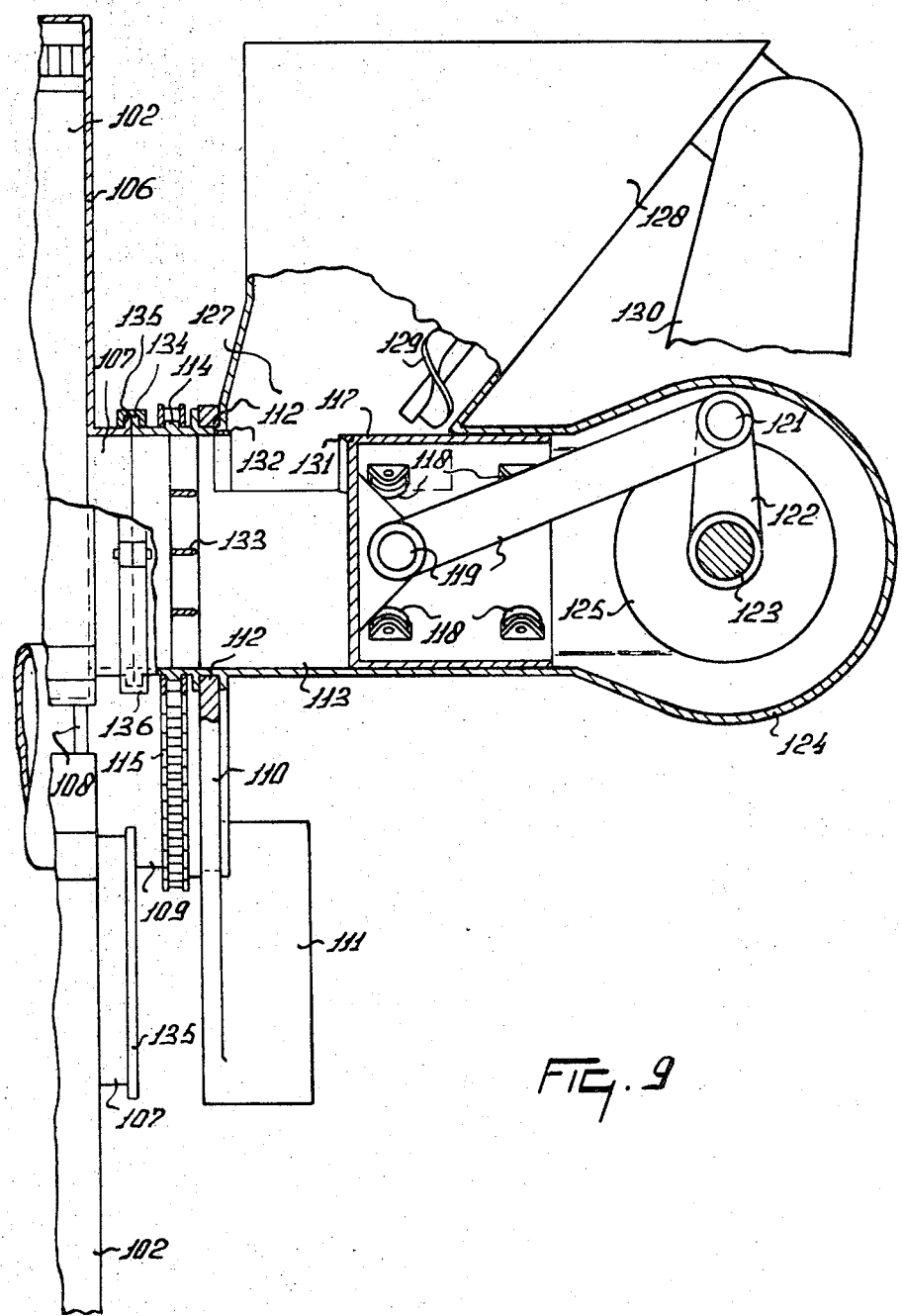
FIG. 9 is part of a view in section taken on the line IX–IX in FIG. 8.
Figure 10:
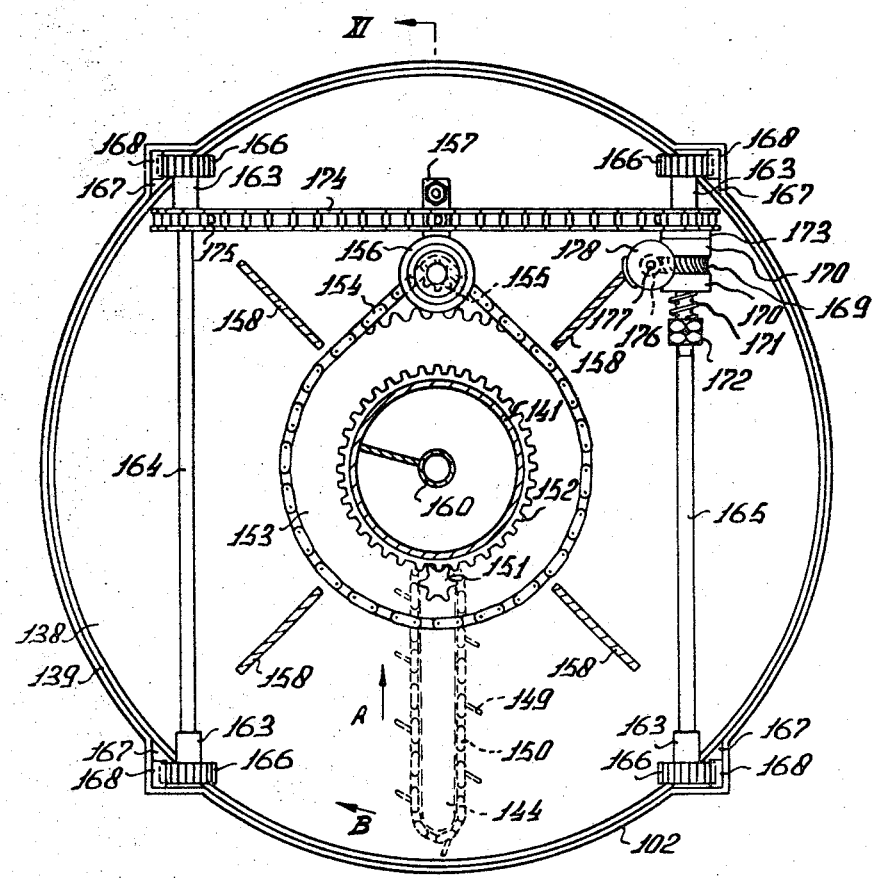
FIG. 10 is a view on an enlarged scale taken on the line X–X in FIG. 6.

A support 110 is adapted to turn around the pipe 109 and is provided at one end with a counterweight 111 and at the other end with a circular opening, the edge 112 of which is held in a slot on the outer side of a supply channel 113 of circular cross section. Near the end of the supply 113 a toothed rack 114 surrounds said channel. A chain 115 is guided around the toothed rack 114 and also around a toothed rack 116 on the pipe 109. The supply channel 113 accommodates a compressing ram 117, which is supported from guide rollers 118, bearing on the wall of the supply channel. The compressing ram 117 is pivoted by means of a shaft 119 to a pitman 120. The other end of the pitman or rod 120 is pivoted by means of a shaft 121 to an arm 122 which is arranged on a shaft 123. The shaft 123 is journaled in the walls of a casing 124, arranged on the rear side of the supply channel 113, said shaft having a flywheel 125, located inside said casing. On the outer side of the casing 124 an electric motor 126 is arranged on one end of the shaft 123. On the upper side of the supply channel 113 an inlet opening 127 is provided in the lower side of a funnel-shaped container 128. The container 128 is fastened to the channel 113 and provided with a worm conveyor 129, extending along a sidewall and driven, in operation, so that crop is conveyed from the container 128 via the inlet opening 127 into the supply channel 113. The worm conveyor 129 is driven from the shaft 123 through a transmission arranged in a casing 130. On the front side the compressing ram 117 is provided with a cutter 131, which is adapted to cooperate with a cutter 132, located near the side of the inlet opening 127 farthest remote from the compressing ram. Near the front end of the supply channel 113, just beyond the opening 127, a plurality of cutters 133 is arranged so that the crop conveyed by means of the compressing ram 117 through the supply channel 113 is cut into blocks (see FIGS. 8 and 9). FIG. 9 shows that the supply channel 113 is provided at the front with a flange 134, which can bear on a flange 135, arranged on each of inlet openings 127 of the silos 102. The joined flanges 134 and 135 can be embraced by a clamping strap 136, so that a satisfactory connection between the supply channel 113 of the compressing device and the inlet opening 107 of a silo 102 can be established. At the end remote from the wall 106 each silo 102 has a discharging device 137. The discharging device 137 comprises a displaceable wall 138, extending transversely of the longitudinal centerline of the silo and provided at the periphery with a bent over rim 139, by means of which the wall 138 joins the walls of the silo. At the center of the wall 138 a bearing 140 holds one end of a pipe 141. The bearing 140 has a circumferential groove 142 for receiving a rim 143 of a wall 138. The bearing 140 is provided on the inner side of the wall 138 with an arm 144, which extends up to the proximity of the wall of the silo. Near the transition of the arm 144 and the bearing 140 a shaft 145 is rotatably supported with respect to the bearing 140 and provided on the inner side of the wall 138 with a gear wheel 146. Near the free end of the arm 144 a gear wheel 147 is rotatable about a shaft 148. Along the wheels 146 and 147 is guided a chain 150, provided with catches 149. FIG. 10 shows that the catches 149 are disposed obliquely in the direction of movement A of the chain 150. The end of the shaft 145, located outside of the wall 138, is provided with a gear wheel 151, which is adapted to cooperate with a toothed rack 152 on the pipe 141. The bearing 140 is held by means of a flange 153, provided at the periphery with teeth, on the toothed rack 152. A chain 154 is guided along the flange 153 and establishes a connection with a gear wheel 155 on the rotary shaft of the electric motor 156, which is secured to the wall 138 by means of a support 157. The pipe 141 is secured to the wall 138 by means of four wings 158. The pipe 141 accommodates a worm conveyor 159, the rotary shaft 160 of which is supported at the end of the pipe 141 remote from the wall 138. On the outer side of the pipe 141 the shaft 160 of the worm conveyor 159 has coupled with it an electric motor 161. The pipe 141 is provided at its end remote from the wall 138 with an opening 162. On the outer side of the wall 138 bearings 163 hold parallel shafts 164 and 165, located on either side of and at equal distances from the center of the wall. Each of the shafts 164 and 165 is provided near the end with ratchet wheels 166, which are adapted to cooperate with toothed racks 168, provided in recesses 167 of the walls of the silo in a direction parallel to the walls of the silo.

A worm wheel 169 is freely rotatable on the shaft 165 and provided on either side with friction material, which is adapted to cooperate with friction material on discs 170, provided on either side on the shaft. The pressure of the discs 170 can be adjusted by means of a spring 171, surrounding the shaft 165 and acting upon one of the discs, and by means of adjusting nuts 172. The worm wheel 169 and the spring-controlled discs 170 form a slip coupling. At the side of the other disc 170 a gear wheel 173 is in contact with this disc and arranged on the shaft 165. The gear wheel 173 is connected by a chain 174 with a gear wheel 175 on the shaft 164. The worm wheel 169 on the shaft 165 is adapted to cooperate with a worm 176 on the rotary shaft 177 of an electric motor 178. The electric motor 178 is fastened to the displaceable wall 138 of the silo by means of a support.

Figure 12:
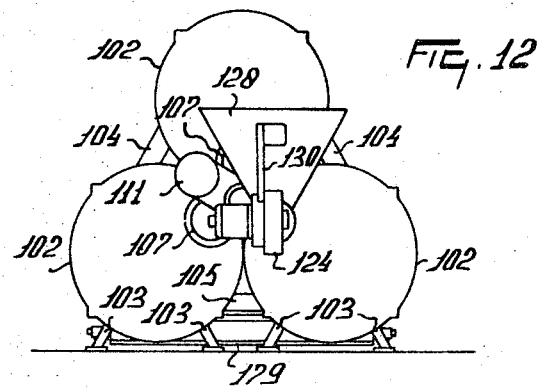
FIG. 12 shows a fourth form of a crop store according to the invention.

FIG. 12 shows an embodiment which differs from the preceding embodiment only in that in this case centrally above two adjacent silos a third silo is provided. For filing the silos there is provided a compressing device similar to the preceding embodiment. Also the discharging device is identical to that of the preceding embodiment.

The structure described above operates as follows:

For filling one of the silos in the embodiments shown through the inlet openings 107 the supply channel 113 of the compressing device can be arranged by turning it about an axis coinciding with the longitudinal centerline of the pipe 109 in a position such that the flange 134 of the front side bears on the flange 135 at the entrance of the inlet opening of a silo. By means of the clamping strap 136 a satisfactory connection of the supply channel 113 with the silo can be established The crop to be stored in the silo may be conveyed, for example, by means of a charging device into the container 138, arranged above the supply channel. From this container the crop is pushed by the worm conveyor 129, extending along a wall of the container, through the inlet opening 127 into the supply channel. The crop is thus displaced in a direction substantially at right angles to the longitudinal centerline of the supply channel, which line extends at least substantially parallel to the axes of symmetry of the silos. The compressing ram 117, reciprocating in the supply channel 113, and driven via the connecting rod 120 by the electric motor 126, compresses the crop supplied from the container 128, while at the end of the stroke of the compressing ram the cutters 133, arranged inside the supply channel, cut the crop into blocks, which are fed through the inlet opening 107 into the silo. Like in the preceding embodiments it is ensured by the high pressure that the air is almost completely expelled from the crop when the silo is filled. When the silo is full, the clamping strap 136, joining the flanges 134 and 135, can be detached and by turning the support 110 and the pipe 109, located between the silos, the compressing device can be moved into a position such that the supply channel 113 can be connected by means of the clamping strap 136 with the inlet opening 107 of an adjacent or subjacent silo. The connection between the supply channel 113 and the pipe 109, formed by the chain 115, guided along the toothed rack 114 and 116, ensures that during the turn of the support 110 the supply channel 113, together with the container 128 fastened thereto invariably occupy the same position. Although the container 128 in the embodiment shown in FIGS. 6 to 12 is arranged on the upper side of the supply channel 113, the container may, of course, be arranged in a different way, for example, on one side.

The construction described above, comprising means such as the specially constructed compressing device, permits in a simple manner of feeding crop under a high pressure into a plurality of silos or store spaces, the silos being arranged so that their longitudinal centerlines extend at least substantially parallel to the horizontal plane.

For discharging the silos filled in the manner described above the discharging device may be employed. The worm conveyor 159 and the discharging members arranged on the inner side of the displaceable wall 138, which comprises an endless conveyor in the form of the chain 150 with the catches 149, can be caused to rotate by means of the electric motors 156 and 161 respectively. By means of the electric motor 156 and the chain 154 the bearing 140 at the center of the wall 138 is caused to rotate so that the arm 144 is rotated in the direction of the arrow B. During the rotation of the bearing 140 the gear wheel 151 on the shaft 145 is caused to rotate by the toothed rack 152 on the pipe 151, so that the endless chain 150 with the catches, arranged on the arm, is moved in the direction of the arrow A. The catches 149 of the chain 150 carry the crop towards the conveyor 159. The worm conveyor 159 in the pipe 141 conveys the crop through the outlet opening 162 to a conveyor belt 179, arranged beneath the outlet opening. According as the silo is discharged further, the wall 138 can be displaced by means of the electric motor 178 and the ratchet wheels 166, arranged on the shafts 164 and 165 and cooperating with toothed racks 168 in the wall of the silo, in the direction towards crop. The displaceable wall 138 also permits of acting upon the pressure by which the crop is inserted into the silo, when the latter is being filled. The displaceable wall 138 may, for example, be initially put in a position in which it is located approximately on the wall 106 of the silo with the inlet opening. According as the space between the wall 138 and the front wall 106 of the silo is filled by crop inserted by the compressing ram, the wall can slowly move back, while the relatively cooperating transmission members such as the ratchet wheels 166, toothed racks 168 and the slip coupling on the shaft 165, together with the worm and the worm wheel, having a self-braking effect, have a delaying effect. The backward movement of the wall may also be performed against spring action. The slower is the backward movement of the wall, the higher is the pressure exerted on the crop in the silo.

The construction shown in FIGS. 13 to 20 relates to a crop store or silo 181 for keeping crop under pressure. The store 181 is held by supports 182 (see FIGS. 13 and 14) and has a cylindrical shape. The longitudinal axis of the store extends at least substantially in a horizontal direction. The ends of the cylindrical store are closed by two conical walls 183 and 184, the vertices of the cones being located at least approximately on the longitudinal centerline beyond the cylindrical store. The wall 184 is secured to the cylindrical wall by means of bolts 184A.

Near the upper side of the silo 181 the conical wall 183 has an inlet 185. The inlet 185 has a flange 186 on the side remote from the silo. The flange 186 is joined by a flange 187, provided at one end of a supply channel 188, which is provided on the upper side with a funnel-shaped inlet opening 189. The supply channel 188 accommodates a compressing member 190. The compressing member 190 comprises a plate 191, extending substantially at right angles to the longitudinal centerline of the supply channel up to the walls of the channel 118. On the rear side of the plate 191 rearwardly projecting plates 192 are provided, which are interconnected by means of a bent over portion. Between the bent over portions of the plates 192 rollers 195, adapted to rotate about shafts 194 are arranged at a distance from each other.

The rollers 195 are constructed at their peripheries so that they can cooperate with the corners of the rectangle-section supply channel 188. On either side of the center the plate 191 is provided on the rear side with two supports 196, between which a connecting rod 198 is arranged by means of a pivotal shaft 197. The other end of the pitman 198 is connected by means of a pivotal shaft 199 with an arm 200, which is arranged on a shaft 201, on which a sprocket wheel 202 is arranged outside the supply channel 188. The sprocket wheel 202 is linked by a chain 203 to a sprocket wheel 204 on a shaft 205. The shaft 205 is provided at one end with a joint for coupling it with an intermediate shaft 206, which can be connected with the power takeoff shaft of a tractor 207. At the other end the shaft 205 is provided with a flywheel 208. Between the lower side of the supply channel 188 and the center of the conical wall 183 there is arranged a support 209. Each of the conical walls 183 and 184 and the cylindrical wall of the silo 181 is provided with a mechanism 210, by means of which the pressure exerted by the crop inside the silo on a wall can be measured. The mechanism 210 comprises a cylindrical casing 211, in which a displaceable part 212 is arranged. The displaceable part 212 has the shape of a flat plate and extends up to the walls of the casing 211. Near the center the part 212 is provided with a rod 213, serving as a guide and taken through the wall of the casing 211 remote from the storing space. Pressure springs 214 surround the rod 213 at regular intervals along the circumference of the part 212, between this part and the wall through which the rod 213 is taken. The end of the rod 213 projecting from the wall of the casing is provided with screw-thread, onto which two nuts 215 are screwed. By tightening the screws 215 to a greater or lesser extent the pretension of the springs 214 can be varied, so that the part 212 together with the rod 213 is displaced. The rod 213 is provided with a dial, which cooperates with the wall through which the rod is taken.

Figure 13:
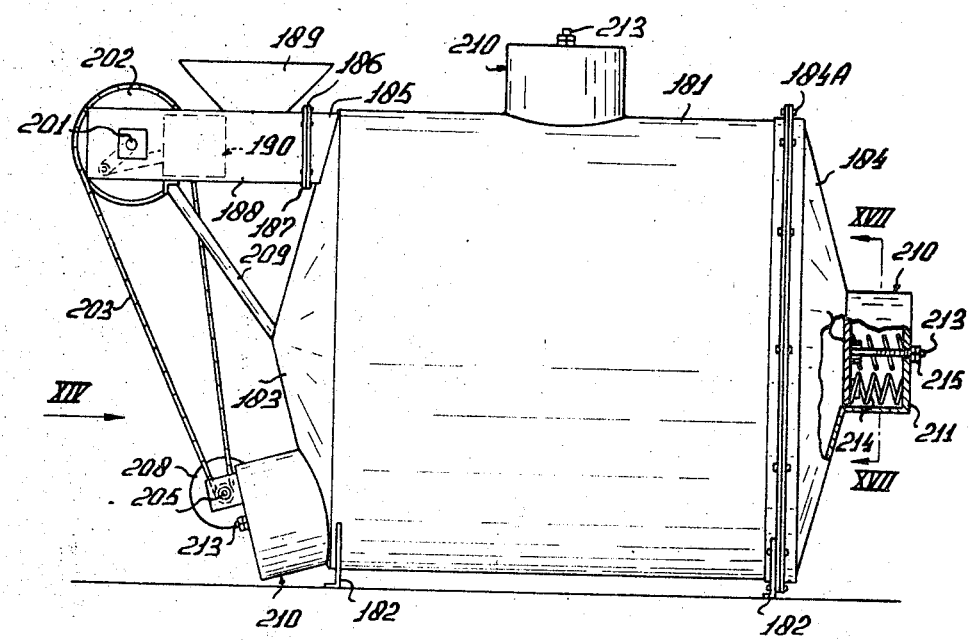
FIG. 13 is a side view of a fifth embodiment of a crop store according to the invention.
Figure 14:
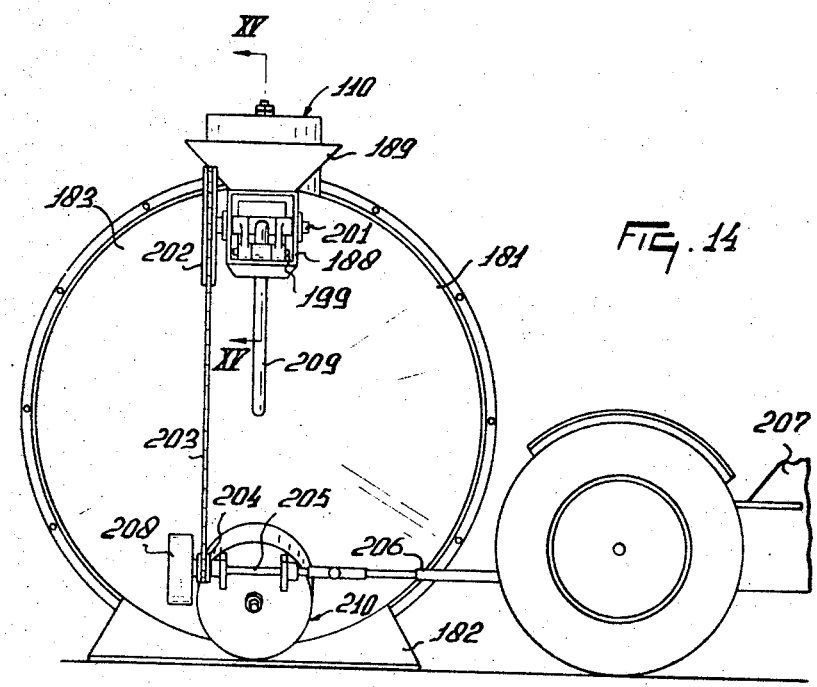
FIG. 14 is a view in the direction of the arrow XIV in FIG. 13 with a tractor for driving the compressing member.

As will be seen from FIG. 13, a mechanism 210 for measuring the pressure exerted by the crop on a wall is provided near the center of the conical wall 184 and near the lower end of the opposite conical wall 183. Moreover, a mechanism 210 for measuring the pressure is arranged on the upper side on the cylindrical wall of the store.

Figure 15:
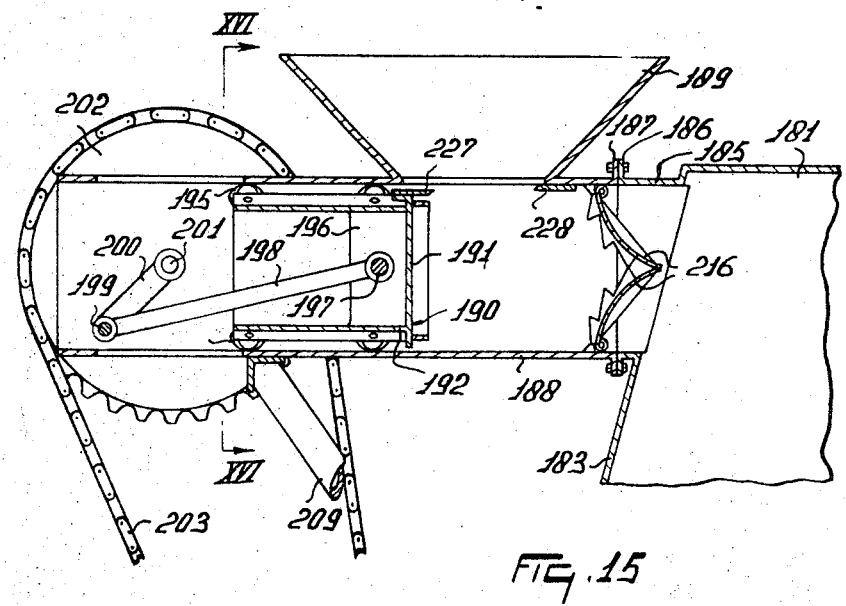
FIG. 15 is part of a view in section taken on the line XV–XV in FIG. 14.
Figure 16:
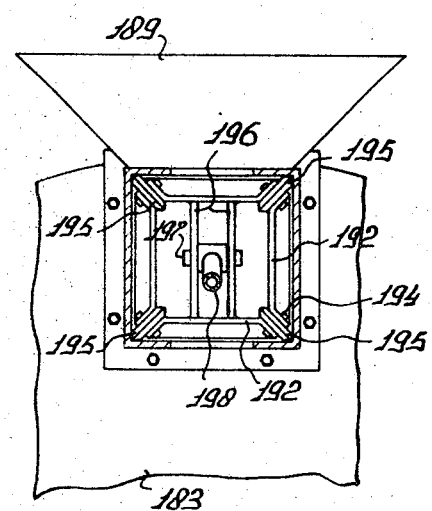
FIG. 16 is a view in section taken on the line XVI–XVI in FIG. 15.
Figure 17:
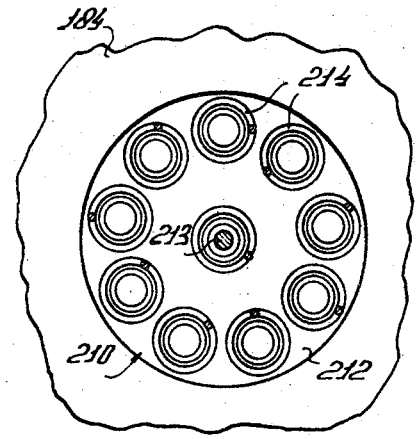
FIG. 17 is a view in section taken on the line XVII–XVII in FIG. 13.

Near the end of the supply channel 188, provided with a flange 187 two arcuated flaps 216 are provided inside the supply channel, the free ends of said flaps extending towards the store (see FIG. 15). The convex sides of the flaps are turned towards the supply channel and secured by means of a pivotal shaft 217 to the wall of the supply channel 188. On the convex proximal sides the flaps 216 are provided with combs 218, which are arranged in three equidistant rows. On the sides facing the store the flaps 216 are provided with stiffening ridges 219. Near the centers of the pivotal shafts 217 a spring 220 is provided for each of the flaps, one end of said springs bearing on the wall of the supply channel 188 and one end bearing on a flap 216. Under the action of the springs 220 the flaps tend to occupy the position shown in FIG. 15.

FIG. 20 shows a second construction for closing the outlet 185. In this embodiment a flap 221 is provided, which occupies a position as is shown in FIG. 20 for closing the supply channel 188. The flap 221 is connected by means of a pivotal shaft 222 with a wall of the supply channel and like in the preceding structure, part of the shaft 222 is surrounded by a spring 223, one end of which bears on the wall of the supply channel 188, whereas the other bears on the flap. On the side facing the store the flap 221 is provided with stiffening ridges 224 and on the side facing the supply channel 188 the flap has rows of combs 225. On the side of the pivotal shaft 22 remote from the store the wall of the supply channel 188 is provided with a stop 226.

The store or silo 181 described above can be filled with the aid of the compressing device. Crop carried from the field can be conveyed through the funnel-shaped opening 189 into the channel 188, and the compressing member or ram 190 of the supply channel, which can be caused to reciprocate by means of the crank transmission described above by the power takeoff shaft of the tractor, feeds the crop into the store. A cutter 227, provided on the upper side of the compressing member 190 is adapted to cooperate with a cutter 228, which is arranged on the wall of the supply channel 188 on the side of the opening 189 facing the store. When the crop is pressed forwards, the flaps arranged at the end of the supply channel 188 are moved in the direction towards the store, while they allow the pushed crop to pass. When the store is filled completely or substantially completely with the crop tightly compressed so that the air is expelled almost entirely, the flaps prevent the crop contained in the store from emerging from the store. The springs acting upon the flaps and the combs provided on one side of the flaps ensure that the flaps are constantly tending to occupy the position shown in FIGS. 15 and 20. The crop contained in the store bears on the portion 212 of the measuring mechanism 210 in the casing 211. The pressure exerted by the crop tends to urge the portion 212 against the action of the stretched pressure springs 213, which form elastic means, in a direction towards the wall of the casing remote from the store. The rod-shaped guide 213, which is provided with a dial, thus protrudes to a greater or lesser extent from the wall of the casing, so that the pressure of the crop on the wall can be read from the dial. The circular, plate-shaped portion 212 preferably has a surface of about 2,000 cms$^2$. Dependent upon the pretension of the spring 214 a greater or smaller deflection of the guide is obtained, when the plate-shaped portion 212 is loaded, while by means of the scale the pressure can be read from the wall. By arranging a measuring mechanism at various places, a satisfactory survey of the pressure prevailing in the store can be obtained.

It will be obvious that the store described above for keeping crop under pressure is also provided with means suitable for discharging the crop. These means may be constructed in any suitable form and are not shown in the FIGS.

The construction shown in FIGS. 21 to 24 comprises a cylindrical crop store or silo 231 for the crop. The width of the silo is at least substantially equal to its height and the silo bears on a concrete foot 232. On the upper side four vertical supports 233 are arranged at equal distances from each other and extending over a given distance along the cylindrical wall of the silo beyond the upper end. The supports 233 are interconnected at the top by means of a circular support 234. A roof 235 of conical shape bears on the support 234, the roof being arranged so that the vertex of the cone is located near the longitudinal centerline of the silo 231. At the periphery the roof 235 is provided with a portion 236, extending downwards towards the silo 231. Near the upper side of the silo 231 a footbridge 237 surrounds the store, said bridge having a sidewall in line with the inclined portion 236 of the roof 235. The footbridge is accessible along a ladder 235A.

The upper side of the silo 231 is closed by a vertically displaceable wall 238. On the upper side the wall 238 has a plurality of chains 239, which converge near the center of the wall, where they are connected with a cable 240, connected with the wall. The cable 240 is coupled through pulleys 241, fixed to the lower side of the roof 235, with a winch 242, which is secured to the support 233 for the roof 235. On the opposite side, beneath the roof, a support 233 is surrounded by a tubular bearing 243, to which a tackle 244 is secured. The displaceable wall 238 is provided with a cavity 245, which communicates through openings with the store containing the crop and with an exhaust pump 247 through a duct 246.

FIG. 21 shows that a compressing device 248 is arranged on the upright wall of the silo 231, said system comprising a supply channel 249, opening out in the upper half of the store 231. The supply channel 249 is disposed so that the longitudinal centerline thereof is at an acute angle to a vertical plane. The supply channel 249 accommodates a compressing member 250, which is coupled via a pitman 251 with an eccentric mechanism 252. The eccentric mechanism 252 is linked by a chain 253 to an electric motor 254, which is arranged on the upright wall of the silo 231. The end of the supply channel 249 remote from the silo is connected by means of a support 255 with the lower side of the silo 231. On the upper side of the supply channel 249 is provided with a funnel-shaped opening 256, above which an endless elevator 257 has its outlet. The outlet of the supply channel 249 in the silo 231 may be closed by means of a slide 258A.

Figure 23:
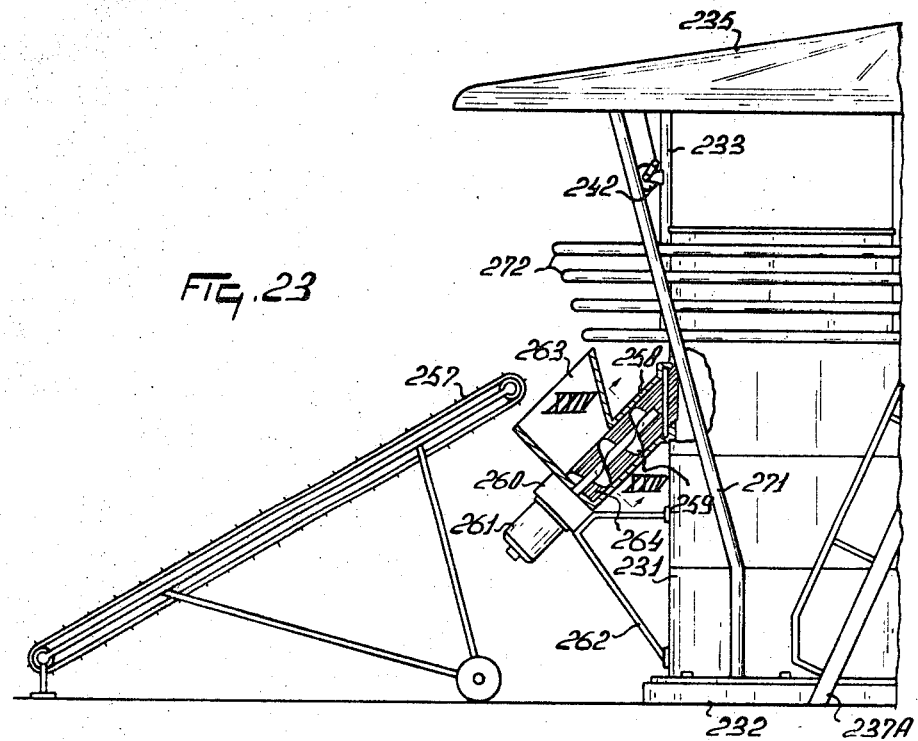
FIG. 23 shows a seventh embodiment of a crop store according to the invention.
Figure 24:
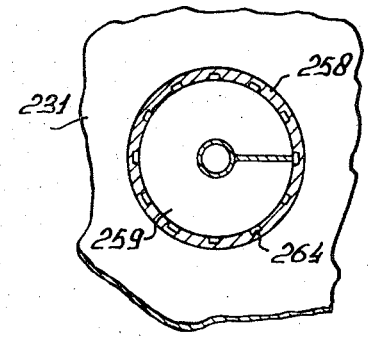
FIG. 24 is a view in section taken on the line XXIV–XXIV in FIG. 23.

FIG. 23 shows an embodiment in which the compressing device comprises a supply channel 258, which, like in the first-mentioned embodiment, opens out in the upper half of the silo and is arranged so that its longitudinal center line is at an acute angle to a vertical plane. Instead of a compressing member reciprocating in operation, this embodiment comprises a rotatable compressing member 259, arranged in the supply channel and formed by a worm conveyor extending up to the outlet opening of the supply channel. The supply channel 259 is provided on the rear side with a transmission 260, which is linked on one side to one end of the rotary shaft of the worm conveyor and on the other side to the rotary shaft of an electric motor 261. The rear side of the supply channel 258 is connected by means of a support 262 with a sidewall of the silo 231. The supply channel 258 has a funnel-shaped opening 263 at the top, above which the endless elevator 257 has its outlet. The inner side of the circular-section supply channel 258 is provided with radial extensions 264, which extend to the vicinity of the periphery of the worm conveyor (see FIG. 24).

The silo 231 can be filled by introducing the crop by means of the endless elevator 257 into the funnel-shaped opening 256 and 263 respectively of the supply channel 249 and 258 respectively of the compressing device. By means of the reciprocatory compressing member 250 or the rotatable compressing member 259 the crop can then be fed into the silo 231. When the silo is filled up to the temporarily fixed upper wall 238, the supply channel can be shut by means of the slide 258A and air can be withdrawn by means of the exhaust pump 247 through the cavity 245 in the upper wall 238 and the openings between this wall and the space containing the crop. The wall 238, joining the upright wall by means of stuffing means (not shown), moves downwards after having been discoupled, so that the crop is further compressed. The oblique position of the supply channel 249 and 258 of the compressing device so that the longitudinal centerline is at an acute angle to a vertical plane, so that the sides of the angle extend in downward direction, facilitates the feeding and the distribution of the crop inside the silo. The extensions 264 on the inner side of the supply channel 258 provide a greater pushing force of the worm conveyor.

The crop thus fed into the silo can be discharged by lifting the upper wall 238 by means of the winch 242, arranged beneath the roof, up to the roof 235 and, if desired, parts of a discharging device 265 (shown diagrammatically in FIG. 23) can be introduced into the silo by means of the tackle 244. The material loosened by the rotating worm conveyor 266 of the discharging device is ejected by a fan into a delivery pipe 267 and is introduced through a row of openings 268, arranged one above the other in the sidewall of the silo, into a cylinder 269, extending on the outside along the whole length of the silo, from where the crop drops on a conveyor belt 270 arranged beneath the cylinder. The discharge pipe 267, which is adapted to turn about a shaft, can be brought into contact with the various openings 268 in the wall of the store in accordance with the height of the discharging device in the silo 265.

The embodiment shown in FIG. 23 comprises supports 271 for a roof, said supports extending obliquely downwards and being fixed below to the outer side of the store space. In this embodiment the footbridge 272 has a different structure.

Figure 25:
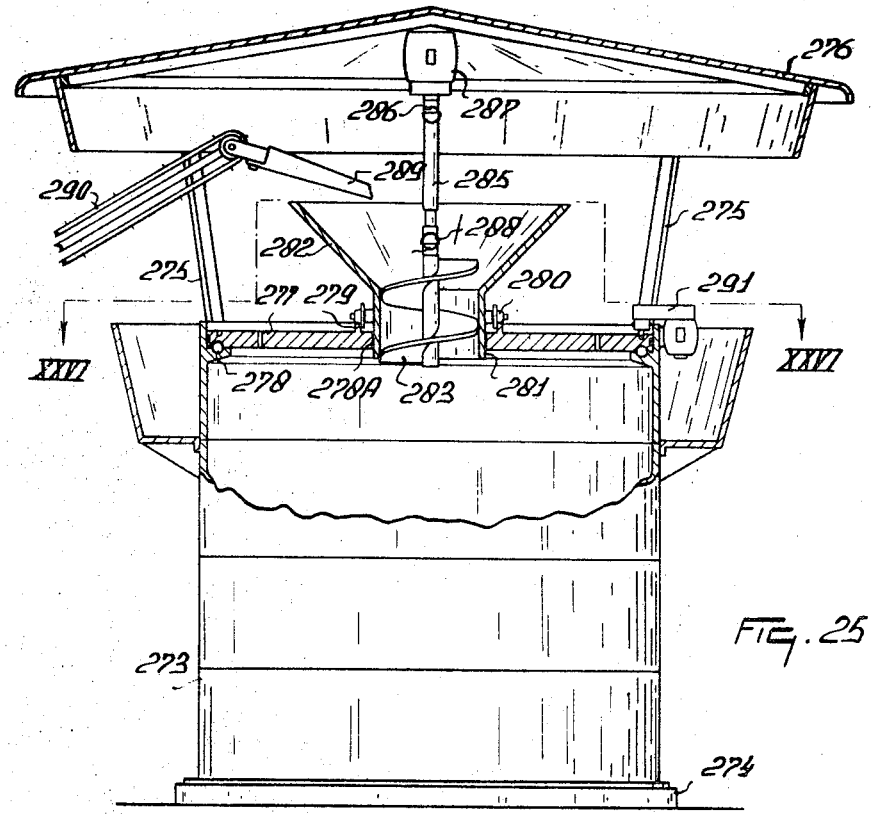
FIG. 25 is a side view of a eighth embodiment of a crop store according to the invention, part of the wall being omitted.
Figure 26:
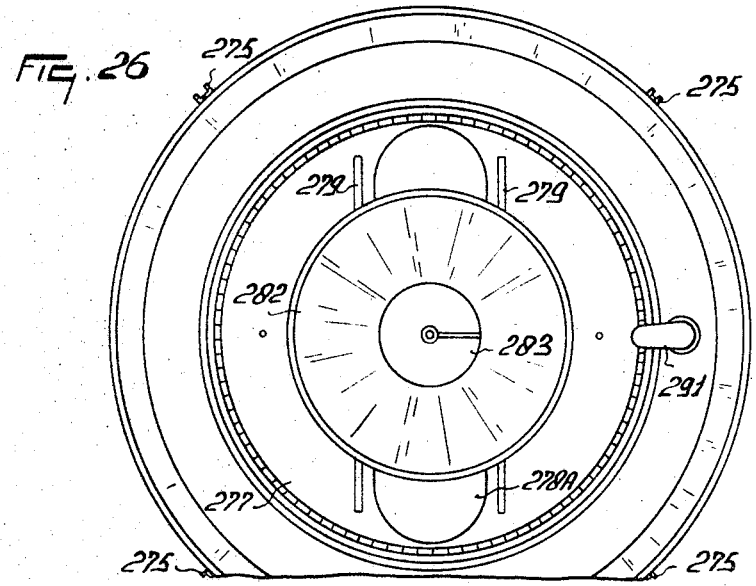
FIG. 26 is a view on the line XXVI–XXVI in FIG. 25.

The construction shown in FIGS. 25 and 26 comprises a cylindrical crop store or silo 273. The silo has a width which is at least substantially equal to the height and bears on a concrete foot 274. On the upper side supports 275 are arranged at equal distances from each other. A roof 276 of conical shape bears on said supports and is arranged so that the vertex of the cone is located near the longitudinal center line of the silo. The upper side of the silo is closed by a wall 277. The wall 277 is rotatably supported by means of a rail 278, arranged on the side of the upright wall of the store. The wall 277 is provided with a radial slot 278A, which has a guide rail 279 on either side. The guide rail supports guide members 280, formed by rollers arranged on the lower side of a supply channel 281 of a compressing device. The supply channel 281 changes above into a funnel-shaped inlet 282. The supply channel 281 accommodates a rotatable compressing member 283, formed by a worm conveyor. The rotatable compressing member 283 is linked by a universal coupling 284 to a telescopic driving shaft 285, which is linked by a universal joint 286 to an electric motor 287, which is arranged near the center below the roof The the universal joint 284 is surrounded by a flexible screening 288. Above the inlet 282 is located the outlet 289 of an elevator 290 for the supply of crop to be introduced into the silo. The upper wall 277 can be turned by means of a drive 291, arranged on the side of the silo.

By means of the conveyor belt 290 crop transported from the field can be shed into the inlet 282 for filling the silo, the crop being then fed into the silo by means of the worm conveyor 283. When the silo is practically filled, the crop introduced can be firmly compressed under a high pressure by means of the last crop introduced by turning the upper wall 277 and by moving the compressing member to and fro along the slot 278, so that the air is expelled substantially completely and a satisfactory preservation of the crop is ensured.

I claim:

1. A crop store comprising at least one container, a longitudinal supply channel for receiving crop being connected to said store, said channel having substantially straight walls along its longitudinal sides and an outlet in communication with the interior of said container, compressing means, including a compressing member that reciprocates in said supply channel and cooperates with at least part of a wall of said channel so that crop in said channel is forced under pressure through said outlet into said container, a discharging device being positioned in said store for discharging crop through an exit in a wall of said container, said exit having an opening which forms a part of the wall of said container.

2. A store as claimed in claim 1, wherein retaining means is positioned adjacent said outlet in said supply channel.

3. A store as claimed in claim 2, wherein said retaining means comprises at least one pivotable, spring-controlled flap.

4. A store as claimed in claim 3, wherein said retaining means includes two relatively cooperating flaps of identical structure, said flaps being convex on the side of said supply channel, said flaps having at least two rows of combs on the entrance side.

5. A store as claimed in claim 1, wherein an automatic crop feeder is mounted adjacent said supply channel to feed crop from said feeder to said supply channel.

6. A store as claimed in claim 1, wherein cutting means is associated within said supply channel, whereby crop is cut substantially parallel to its direction of movement through said channel.

7. A store as claimed in claim 1, wherein said compressing means and said supply channel are movably mounted on said store relative to said container.

8. A store as claimed in claim 1, wherein said container has a displaceable wall and conveying means is positioned for moving crop through said displaceable wall, said displaceable wall extending substantially at a right angle to the axis of symmetry of said store.

9. A store as claimed in claim 8, wherein said exit is located in the displaceable wall near the center thereof.

10. A store as claimed in claim 8, wherein said store includes discharging mechanism and said mechanism is mounted adjacent the center of said displaceable wall, releasing members being located on the side of said displaceable wall facing crop stored in said store, said releasing members being positioned to move crop to said discharging mechanism.

11. A store as claimed in claim 10, wherein said discharging mechanism comprises a worm conveyor which extends substantially parallel to the axis of symmetry of said store, said releasing members comprising an endless conveyor provided with catches, said endless conveyor extending substantially parallel to said displaceable wall and said endless conveyor being rotatable about an axis extending substantially parallel to the axis of symmetry of said store.

12. A store as claimed in claim 8, wherein transmission means is connected to said displaceable wall, to displace the same in the longitudinal direction of the axis of symmetry of said store, said transmission means comprising at least one gear wheel, which cooperates with a gear rack on the inner side of the longitudinal walls of said store, said gear wheel being mounted on a driving shaft connected to drive means and said drive means including a slip coupling.

13. A store as claimed in claim 12, wherein the speed of displacement of said displaceable wall can be varied by adjusting means associated with said transmission means.

14. A store as claimed in claim 13, wherein the axis of symmetry of said store is substantially horizontal, and said store includes a plurality of containers, said compressing means being movable relative to said containers and having coupling means for connection to any one of said containers, whereby said compressing means can be connected to load crop into all of said containers.

15. A store as claimed in claim 14, wherein said compressing means is mounted for movement on a pivotable support, said support being turnable about an axis extending parallel to the axis of symmetry of said store and said compressing means being turnably associated with its support, whereby said compressing means remains upright when turned and connected to any of said containers.

16. A store as claimed in claim 15, wherein a chain is associated with said compressing means for turning same with respect to said support, said support being pivotally mounted on a pipe and said chain extending between said supply channel and said pipe, and being guided along toothed racks surrounding said supply channel and said pipe respectively, a counterweight fastened to said support on the side of said pipe remote from said compressing means.

17. A store as claimed in claim 16, wherein there are two side-by-side containers in a unit, and one unit is located above a second unit, each of the containers of said units having an inlet opening, the centers of said inlet openings being arranged in a circle with the center of said circle coinciding with the pivotal axis of the support for said compressing means.

18. A store as claimed in claim 1, wherein said container has at least one pressure-responsive mechanism mounted thereon for indicating the pressure exerted by the crop on one of said walls.

19. A store as claimed in claim 18, wherein said mechanism comprises at least one portion which is displaceable parallel to itself and which is in contact with the crop.

20. A store as claimed in claim 19, wherein elastic means are provided for counteracting a displacement of said portion in one direction.

21. A store as claimed in claim 20, wherein said portion has a flat structure and is accommodated in a casing whereby said portion extends at least substantially at right angles to the longitudinal centerline of the casing.

22. A store as claimed in claim 21, wherein said elastic means are located inside the casing and comprises at least one pressure spring.

23. A store as claimed in claim 21, wherein a guide is associated with said displaceable portion, said guide being adjacent the casing and projecting through a wall from said casing, said guide being provided with a dial adapted to cooperate with said wall of the casing.